US006549432B1

(12) United States Patent
Giannopoulos et al.

(10) Patent No.: US 6,549,432 B1
(45) Date of Patent: Apr. 15, 2003

(54) SINGLE-WINDING, MULTIPLE-OUTPUT, BI-DIRECTIONAL FLYBACK CONVERTER

(75) Inventors: Demetri Giannopoulos, Norwalk, CT (US); Laurence Bourdillon, New Milford, CT (US); Nai-Chi Lee, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/086,028

(22) Filed: Feb. 28, 2002

(51) Int. Cl.$^7$ .............................................. H02M 3/335
(52) U.S. Cl. .................................................. 363/21.14
(58) Field of Search ...................................... 363/21.14

(56) References Cited

U.S. PATENT DOCUMENTS

| | | | |
|---|---|---|---|
| 4,847,742 A | * 7/1989 | Ohashi et al. ............ | 363/21.14 |
| 5,617,015 A | 4/1997 | Goder et al. ................. | 323/282 |
| 5,663,874 A | * 9/1997 | Mader et al. ............ | 363/21.14 |
| 6,330,169 B2 | * 12/2001 | Mullett et al. ............ | 363/21.14 |

FOREIGN PATENT DOCUMENTS

| | | | |
|---|---|---|---|
| EP | 698959 | * 2/1996 | .......... H02M/3/335 |
| EP | 772284 | * 5/1997 | .......... H02M/3/335 |

* cited by examiner

*Primary Examiner*—Jeffrey Sterrett
(74) *Attorney, Agent, or Firm*—Edward W. Goodman

(57) ABSTRACT

A multiple-output, bi-directional flyback converter with soft switching of an input switch is disclosed. The primary-side of the converter is comprised of an input power supply, a transformer with a primary winding and a secondary winding, and an input switch with an associated diode, wherein a first end of the primary winding is connected to the input power supply and a second end of the primary winding is connected to the input switch. A first predetermined number of output voltage circuits are connected to a single secondary winding or one of a plurality of secondary windings each producing an output voltage. Each output voltage circuit has an output switch with an associated diode, and a diode connected in series between the output voltage switch and the secondary winding. A last output voltage circuit with a bi-directional switch and associated diode is connected connection to the secondary winding. A control unit controls the switching of the input switch, the predetermined number of output switches and the bi-directional switch, wherein the switching of the bi-directional switch is controlled so as to allow for soft switching of the input switch.

24 Claims, 4 Drawing Sheets

SINGLE-WINDING, MULTIPLE-OUTPUT, BI-DIRECTIONAL FLYBACK CONVERTER

FIELD OF THE INVENTION

The invention relates generally to multiple-output, off-line power converters, and more particularly to multiple-output, single winding, bi-directional flyback converters.

BACKGROUND OF THE INVENTION

There are increasing demands in the electronic industry for power supplies that provide multiple regulated outputs. With various integrated circuits and electronic devices operating at different voltages, the ability to supply efficiently regulated multiple voltage outputs from a single power supply has become increasingly more important.

Flyback converters constitute an economically advantageous solution to implement off-line power supplies with multiple outputs. The principle of bi-directional flyback is well known. Bi-directional flyback was first used in uninterrupted power supplies (UPS) where a bi-directional flyback would charge a battery most of the time, i.e., energy flowing into the battery. When the input power source is interrupted, the energy then flows out of the battery and into the load.

FIG. 1 illustrates a known flyback converter. The flyback converter is comprised of a power supply 102, a transformer 103 with a primary winding 104 and a plurality of secondary windings 106, 112, 114, one for each voltage output, a power supply controller 108, an input switch 110 and post regulators 116, 118. In this example, the flyback implementation uses a single switch 110 on the primary side of the transformer 103 to directly regulate the output voltage $V_A$. The cross-regulation of the rest of the output voltages is achieved by the turns ratio of the secondary windings 112 and 114. However, the presence of leakage inductance and other parasitics results in wide tolerances for the cross-regulated outputs, which do not satisfy strict regulation requirements. The post regulators 116 and 118 are thus necessary to improve the regulation of the output voltages. However, this approach increases the cost and reduces the efficiency of the power supply.

Recently secondary-side control methods have been proposed in European Patent Nos. 0 698 959 and 0 772 284 and U.S. Pat. No. 5,617,015, which include switches on the secondary side of the transformer. The switches on the secondary side of the transformer are used to provide independently regulated outputs, which operate over universal mains voltage and wide load variations. The value of each voltage output can be independently set at different levels by the controller without modification of the circuit.

In European Patent No. 0 698 959, as illustrated in FIG. 2, a separate secondary-side winding 210, 212, 214 is used to generate each output voltage $V_1$, $V_2$, $V_3$, respectively. A rectifying diode 216, 218, 220 is connected in series with each secondary winding 210, 212, 214, respectively. A semiconductor power switch 222, 224 is connected in series with all but the first secondary winding 210. A regulator $RS_1$ of the first output circuit controls the regulator $RS_0$ of the primary side circuit 202. Output regulators $RS_2$ and $RS_3$ control the secondary side switches 222 and 224, respectively. The input dc voltage $V_{IN}$, a voltage representation of the primary side switch 204 and the output of one of the regulators are also fed to the primary side regulator $RS_0$.

European Patent No. 0 772 284 describes a different secondary-side control method where one secondary winding supplies multiple output voltages via separate branches as illustrated in FIG. 3. Each output voltage $V_1$, $V_2$, $V_3$ is rectified by a diode 302, 304, 306. The first output $V_1$ is regulated by the pulse width of the primary-side switch 308. A switch 310, 312, is inserted in series into each branch supplying the rest of the output voltages $V_2$, $V_3$. A regulator 314 and 316 senses each of the output voltages $V_2$, $V_3$ and controls the duty cycle of the corresponding switch to regulate the output voltage.

U.S. Pat. No. 5,617,015 describes a voltage regulator providing multiple independently regulated outputs as illustrated in FIG. 4. A dedicated switch 402, 404, 406 for each output voltage $V_1$, $V_2$, $V_3$ controls the energy delivered to the output. Energy is delivered to the outputs that have fallen below the lower limit of an acceptable range. A voltage regulator 408 stops supplying the outputs that have exceeded the upper limit of the acceptable range. The input switch 410 directly regulates the output connected to the output switch 402, 404, 406 which is turned on last in the switching sequence.

As noted above, the above-described methods control the on and off state of the primary-side switch based on the values of the output voltages. However, these methods result in hard switching of the primary-side switch which increases the switching losses and reduces the efficiency of the power converter. Thus, there is a need for a bi-directional flyback converter which reduces switching losses by preventing hard switching of the primary-side switch.

SUMMARY OF THE INVENTION

It is an object of the invention to overcome the above-described deficiencies of the known flyback converters by providing a multiple-output, bi-directional flyback converter with soft switching of the input switch.

According to one embodiment of the invention, a bi-directional flyback converter is disclosed. The primary-side of the converter is comprised of an input power supply, a transformer with a primary winding and a secondary winding, and an input switch with an associated diode, wherein a first end of the primary winding is connected to the input power supply and a second end of the primary winding is connected to the input switch. A first predetermined number of output voltage circuits are connected to the secondary winding each producing an output voltage. Each output voltage circuit has an output switch with an associated diode, and a diode connected in series between the output voltage switch and the secondary winding. A last output voltage circuit with a bi-directional switch and associated diode is connected connection to the secondary winding. A control unit controls the switching of the input switch, the predetermined number of output switches and the bi-directional switch, wherein the switching of the bi-directional switch is controlled so as to allow for soft switching of the input switch.

According to another embodiment of the invention, a bi-directional flyback converter is disclosed. The primary-side of the converter is comprised of an input power supply, a transformer with a primary winding and a secondary winding, and an input switch with an associated diode, wherein a first end of the primary winding is connected to the input power supply and a second end of the primary winding is connected to the input switch. A first predetermined number of output voltage circuits are connected to a separate secondary winding each producing an output voltage. Each output voltage circuit has an output switch with an associated diode, and a diode connected in series between the output voltage switch and the secondary winding. A last output voltage circuit with a bi-directional switch and associated diode is connected connection to a separate secondary winding. A control unit controls the switching of the input switch, the predetermined number of output switches and the bi-directional switch, wherein the switching of the bi-directional switch is controlled so as to allow for soft switching of the input switch.

These and other aspects of the invention will be apparent from and elucidated with reference to the embodiments described hereafter.

BRIEF DESCRIPTION OF THE DRAWINGS

The invention will now be described, by way of example, with reference to the accompanying drawings, wherein.

DETAILED DESCRIPTION OF THE INVENTION

Figure 1:
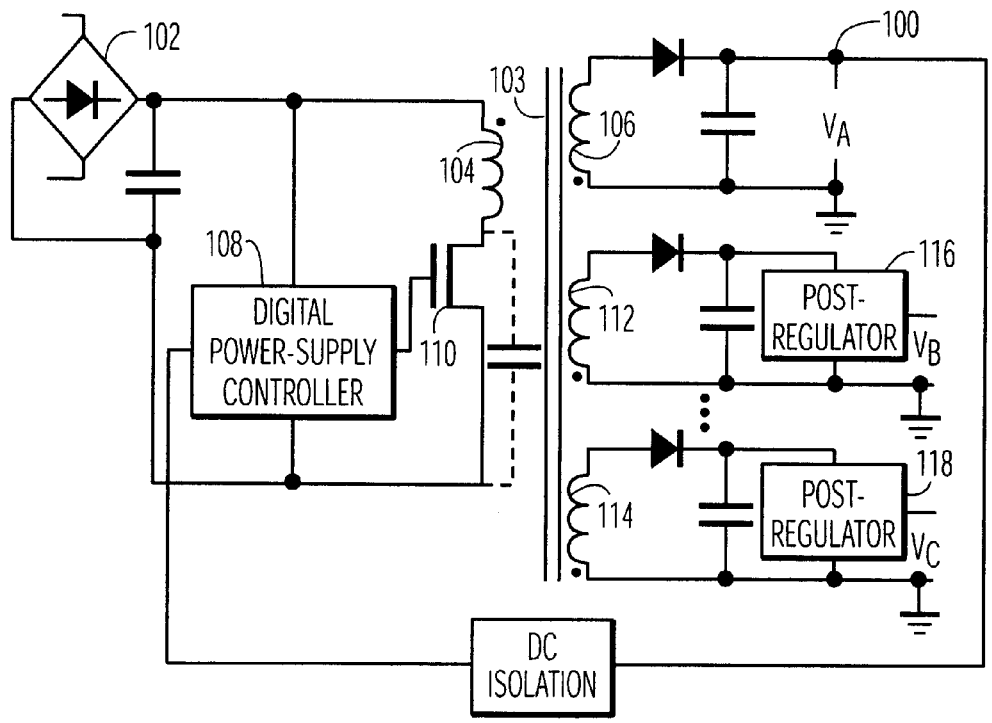
FIG. 1 is a block diagram of a known flyback converter.
Figure 2:
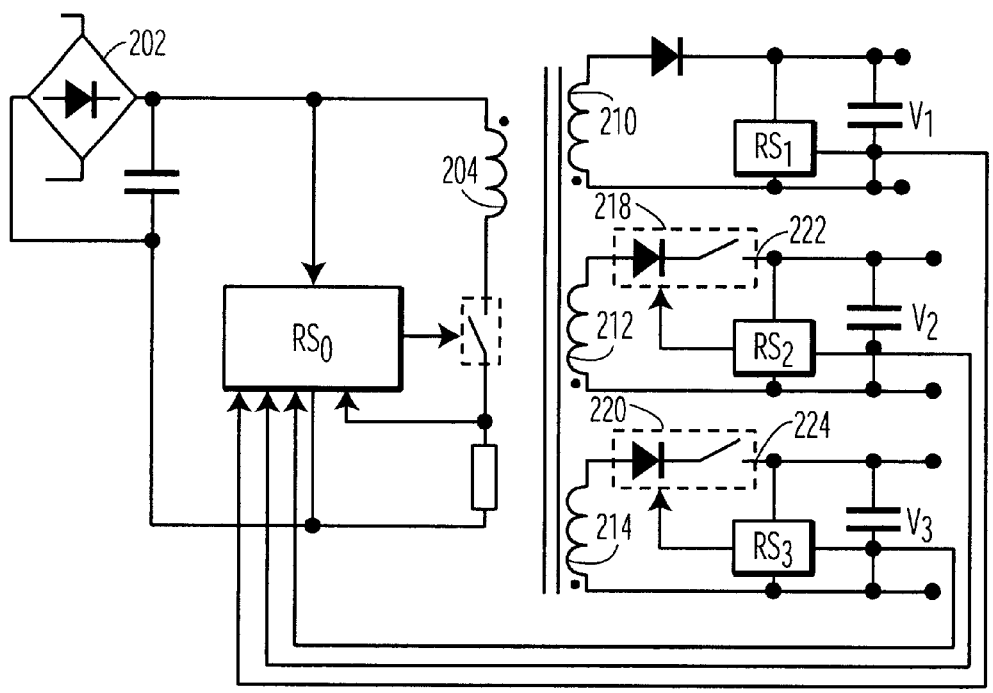
FIG. 2 is a block diagram of a known flyback converter.
Figure 3:
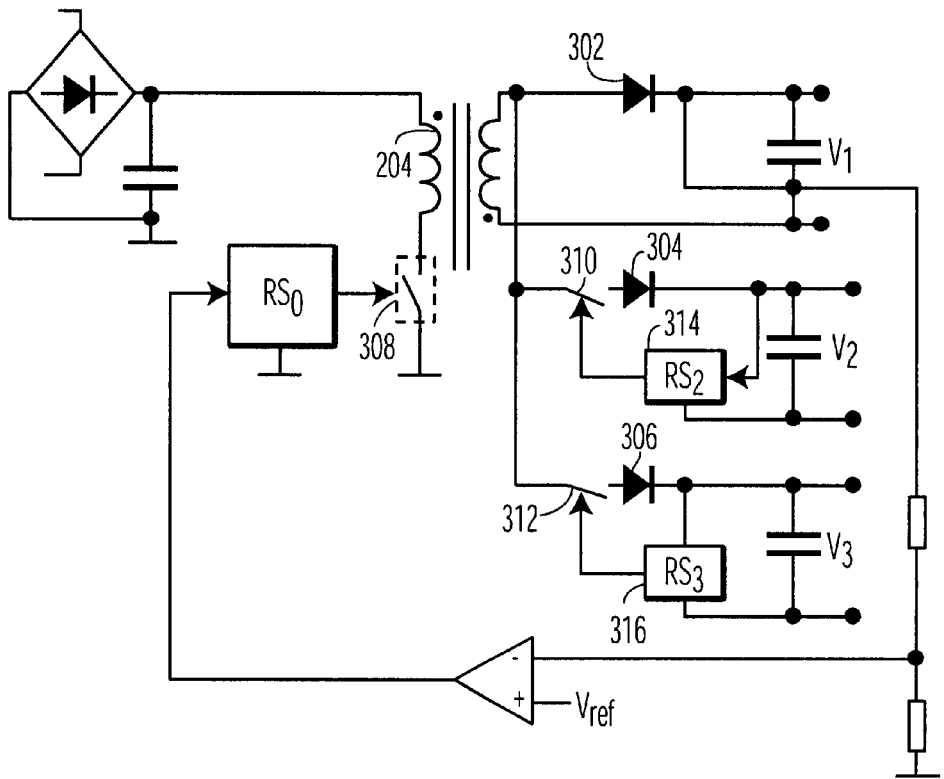
FIG. 3 is a block diagram of a known flyback converter.
Figure 4:
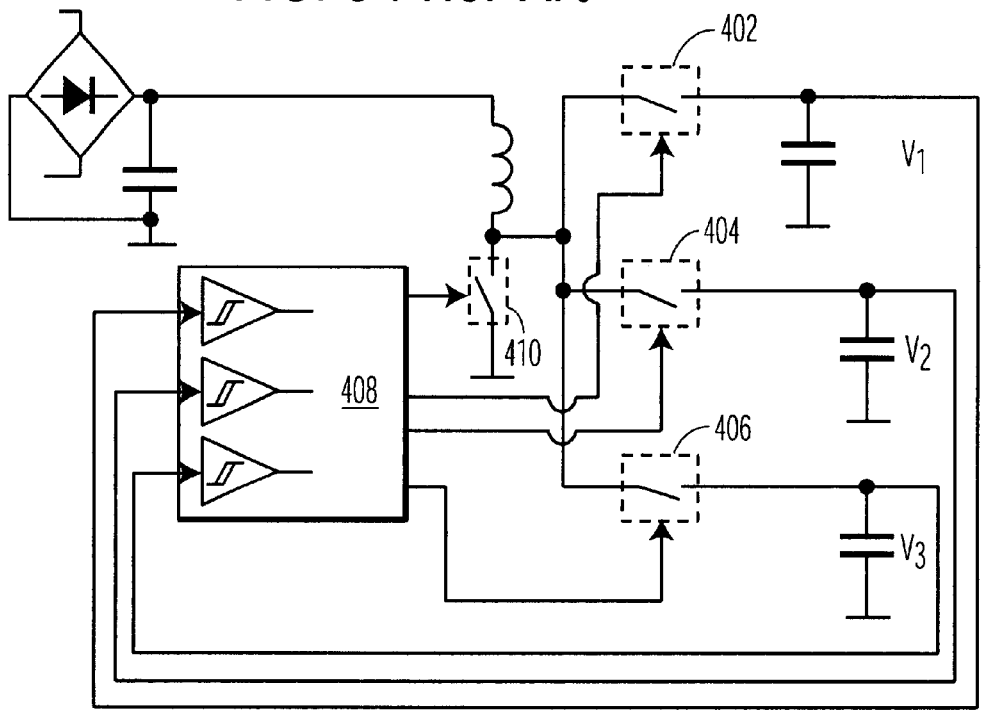
FIG. 4 is a block diagram of a known flyback converter.
Figure 5:
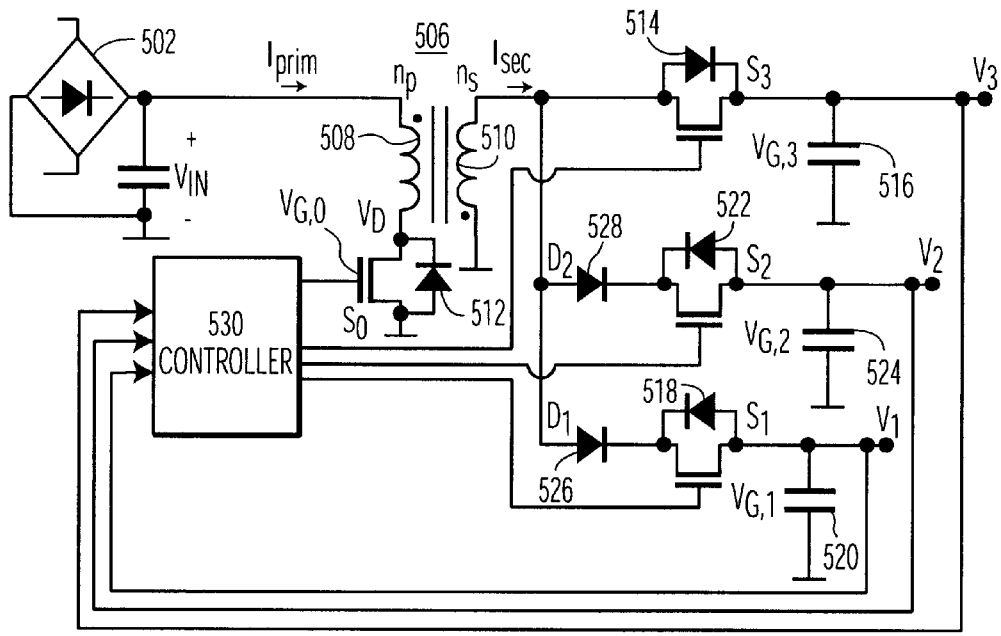
FIG. 5 is a block diagram of a multiple-output, single winding bi-directional flyback converter according to one embodiment of the invention.

FIG. 5 illustrates a multiple-output, single winding bi-directional flyback converter 500 according to one embodiment of the invention. In this illustrative embodiment, the converter has three power outputs, but it will be understood that the converter is not limited thereto. An input power supply 502 is connected to the primary winding 508 of a transformer 506 which has $n_p$ turns. The other connection of the primary winding 508 is connected to a switching device $S_0$ to which a diode 512 is connected in parallel. The switching device $S_0$ is, for example, a MOS field effect transistor but the invention is not limited thereto. The switching device $S_0$ has a conductive channel and a control terminal. In this case, the so-called body diode of the field effect transistor may be used as the diode 512. The cathode of the diode 512 is connected to the primary winding 508 of the transformer 506, the anode of the diode 512 is connected to ground so that the parallel combination of the switching device $S_0$ and the diode 512 lies between the primary winding of the transformer 506 and ground. The switching positions of the switching device $S_0$ are determined by a controller 530 by applying a control signal $V_{G,0}$ to the control terminal of the switching device $S_0$.

On the output side of the converter 500, a plurality of output voltage circuits are connected to a secondary winding 510 of the transformer 506 having $n_s$ turns. The output voltage circuits are divided into two groups: the first group of output voltage circuits 517, 519 and the last output circuit 515. The last output circuit is the last circuit in a switching cycle. The first group of output voltage circuits can have one or more circuits. FIG. 5 illustrates an example with two output voltage circuits in the first group but the invention is not limited thereto.

Each output voltage circuit 517 and 519 of the first group of output voltage circuits comprises a diode (526, 528), a switching device ($S_1$, $S_2$) to which a body diode (518, 522) is connected in parallel, and a smoothing capacitor (520, 524). In the first output voltage circuit, the anode of the diode 526 is connected to the secondary winding 510 of the transformer 506 and the cathode of the diode 526 is connected to the switching device $S_1$. The switching device $S_1$ is, for example, a MOS field effect transistor but the invention is not limited thereto. The switching device $S_1$ has a conductive channel and a control terminal. In this case, the so-called body diode of the field effect transistor may be used as the diode 518. The cathode of the diode 518 is connected to the cathode of the diode 526, the anode of the diode 518 is connected to the voltage output $V_1$ so that the parallel combination of the switching device $S_1$ and the diode 518 lies between the secondary winding of the transformer 506 and the voltage output $V_1$. The smoothing capacitor 520 is connected between the switching device $S_1$ and the output voltage $V_1$. The switching positions of the switching device $S_1$ are determined by a controller 530 by applying a control signal $V_{G,1}$ to the control terminal of the switching device $S_1$. This same configuration is used for each output voltage circuit in the first group of output voltage circuits.

The last output voltage circuit 515 is comprised of a switching device $S_3$ to which a body diode 514 is connected in parallel, and a smoothing capacitor 516. The switching device $S_3$ is connected to the secondary winding 510 of the transformer 506. The switching device $S_3$ is, for example, a MOS field effect transistor but the invention is not limited thereto. The switching device $S_3$ has a conductive channel and a control terminal. In this case, the so-called body diode of the field effect transistor may be used as the diode 514. The anode of the diode 514 is connected to the secondary winding 510 of the transformer 506, the cathode of the diode 514 is connected to the voltage output $V_3$ so that the parallel combination of the switching device $S_3$ and the diode 514 lies between the secondary winding of the transformer 506 and the voltage output $V_1$. By configuring the switching device $S_3$ and the diode 514 in such a manner, the switching device $S_3$ is able to conduct current in both directions as will be explained in greater detail below. The smoothing capacitor 520 is connected between the switching device $S_3$ and the output voltage $V_3$. The switching positions of the switching device $S_3$ are determined by a controller 530 by applying a control signal $V_{G,3}$ to the control terminal of the switching device $S_3$.

Figure 6:
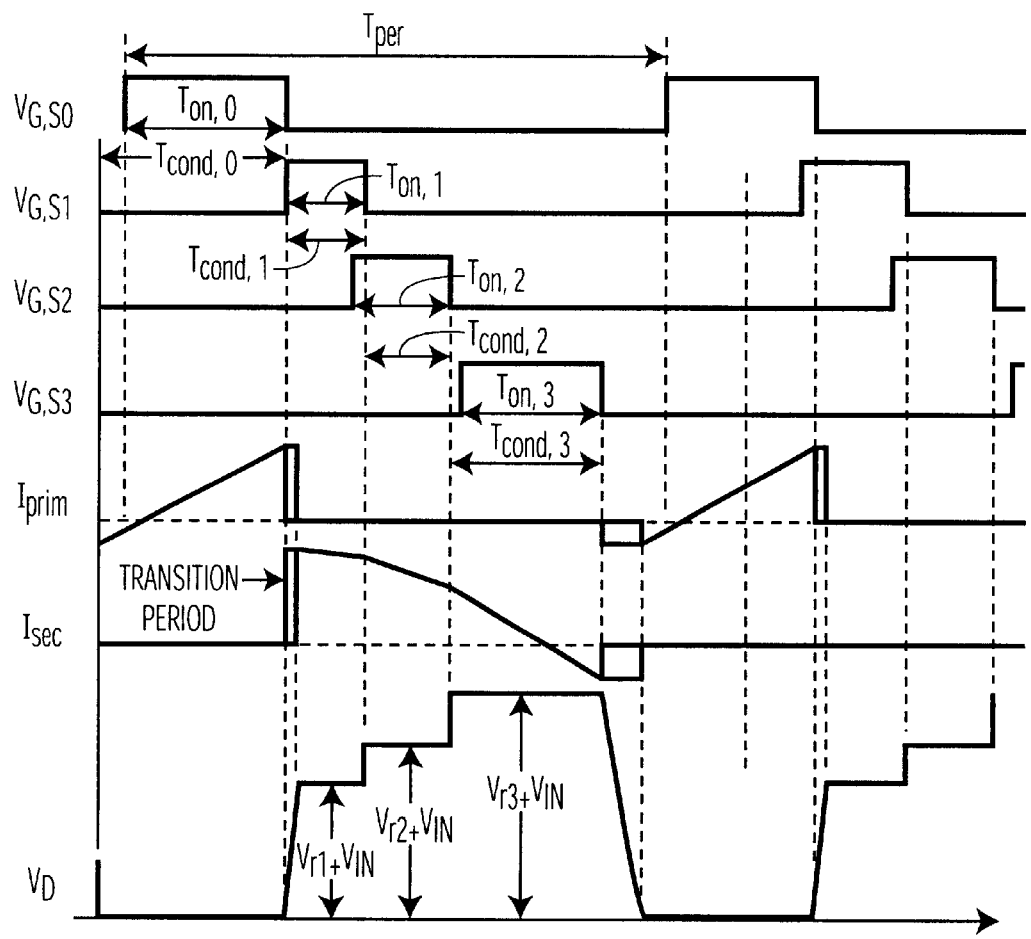
FIG. 6 is a timing diagram for the bi-directional flyback converter illustrated in FIG. 5 according to one embodiment of the invention.

$V_{r1}$, $V_{r2}$, and $V_{r3}$ represent the respective output voltages reflected through the turns ratio to the primary side of the transformer. These voltages are respectively summed with the input voltage as shown in FIG. 6 and this summed voltage appears on the drain of the primary switch $S_0$. In the invention, which is aimed at off-line, universal input (110VAC, 220VAC, 277VAC) power supplies, the drain voltage of the input switching device $S_0$ in the off state can be over 600V. Therefore, zero voltage switching is critical for high efficiency. The amount of circulated energy to achieve zero-voltage switching varies with the input voltage. The invention controls the conduction time of the input switching device $S_0$ to regulate the drain voltage $V_D$ of the input switch to a near zero value. For higher input voltages, the invention increases the conduction time of the input switching device $S_0$ to allow for increased circulated energy to keep the drain voltage value near zero. As will be explained in more detail below, the last conducting secondary side switching device ($S_3$ in FIG. 5) in the switching cycle is allowed to conduct current in both directions. As a result, at the end of the switching cycle, current is flowing through the body diode 512 of the input switching device $S_0$ which drives the voltage across the switching device $S_0$ to approximately zero. When the switching device $S_0$ is turned on at the beginning of the following switching cycle, zero-voltage switching is achieved. Thus, the invention achieves zero voltage switching for universal mains voltage.

FIG. 6 illustrates a timing diagram for the bi-directional flyback converter illustrated in FIG. 5 according to one embodiment of the invention. FIG. 6 shows the control voltages $V_{G,S0}$, $V_{G,S1}$, $V_{G,S2}$, and $V_{G,S3}$ of the primary-side switching device $S_0$ and the secondary-side switching devices $S_1$, $S_2$, $S_3$, respectively. $I_{prim}$ and $I_{sec}$ are the primary and secondary currents of the transformer 506 and $V_{r1}$, $V_{r2}$, $V_{r3}$ are the reflected voltages of outputs $V_1$, $V_2$, and $V_3$. In this illustrative example, the switching period $T_{per}$ begins when the switching device $S_0$ is turned on and ends when the switching device $S_0$ is turned on again. The conduction time $T_{cond,0}$ for the switching device $S_0$ begins before the switching device is turned on and the primary current $I_{prim}$ begins to rise. Once the switching device $S_0$ is turned on $T_{on,0}$, the primary current rises for the duration of the $T_{on,0}$ period to a desired current level. Before the switching device $S_0$ is turned off, the first secondary-side switching device $S_1$ is turned on $T_{on,1}$. When the switching device $S_0$ is turned off, the conduction time $T_{cond,0}$ of the switching device $S_0$ ends and the conduction time $T_{cond,1}$ of the switching device $S_1$ begins. In addition, after the switching device $S_0$ is turned off, a first transition period begins wherein the primary current quickly goes to zero and the secondary current quickly increase from zero to its maximum value. During the first transition period, the drain voltage $V_D$ of the switching device $S_0$ quickly rises to a voltage level equal to $V_{IN} + V_{r1}$. After the first transition period, the secondary current gradually decreases.

Before the switching device $S_1$ is turned off, the switching device $S_2$ is turned on. However, the conduction time $T_{cond,2}$ of the switching device $S_2$ is not begun until the switching device $S_1$ is turned off. When the switching device $S_1$ is turned off, the drain voltage increases to $V_{IN} + V_{r2}$. During the period that the switching device $S_1$ is on, the secondary current continues to fall.

When the switching device $S_2$ is turned off, the drain voltage rises to $V_{IN} + V_{r3}$ and the conduction time of the switching device $S_3$ begins, but the switching device $S_3$ is not turned on. During the switching device's $S_3$ conduction time $T_{cond,3}$, the initially positive secondary current flows through the body diode 514 of the switching device $S_3$. Before the secondary current becomes negative, the switching device $S_3$ is turned on. While the secondary current is negative, the switching device $S_3$ is turned off. When the switching device $S_3$ is turned off, a second transition period begins. During the second transition period, the secondary current rises to zero and the primary current is driven negative. The negative primary current flows through the body diode 512 of the primary switching device $S_0$ which pulls the drain voltage from a voltage of $V_{IN} + V_{r3}$ to a voltage level of approximately zero. As a result, when the switching device $S_0$ is turned on at the beginning of the next switching period, no switching losses occur.

If the conduction sequence of the secondary switching devices $S_1$, $S_2$, and $S_3$ follows an increasing order of the outputs ($V_1 < V_2 < V_3$) they are connected to, then no switching losses occur at turn on of all four switches in FIG. 5. Soft switching of the switching device $S_1$ is achieved by turning on the switching device $S_1$ before the switching device $S_0$ is turned off. Likewise, soft switching of the switching device $S_2$ is achieved by turning on the switching device $S_2$ before the switching device $S_1$ is turned off.

Figure 7:
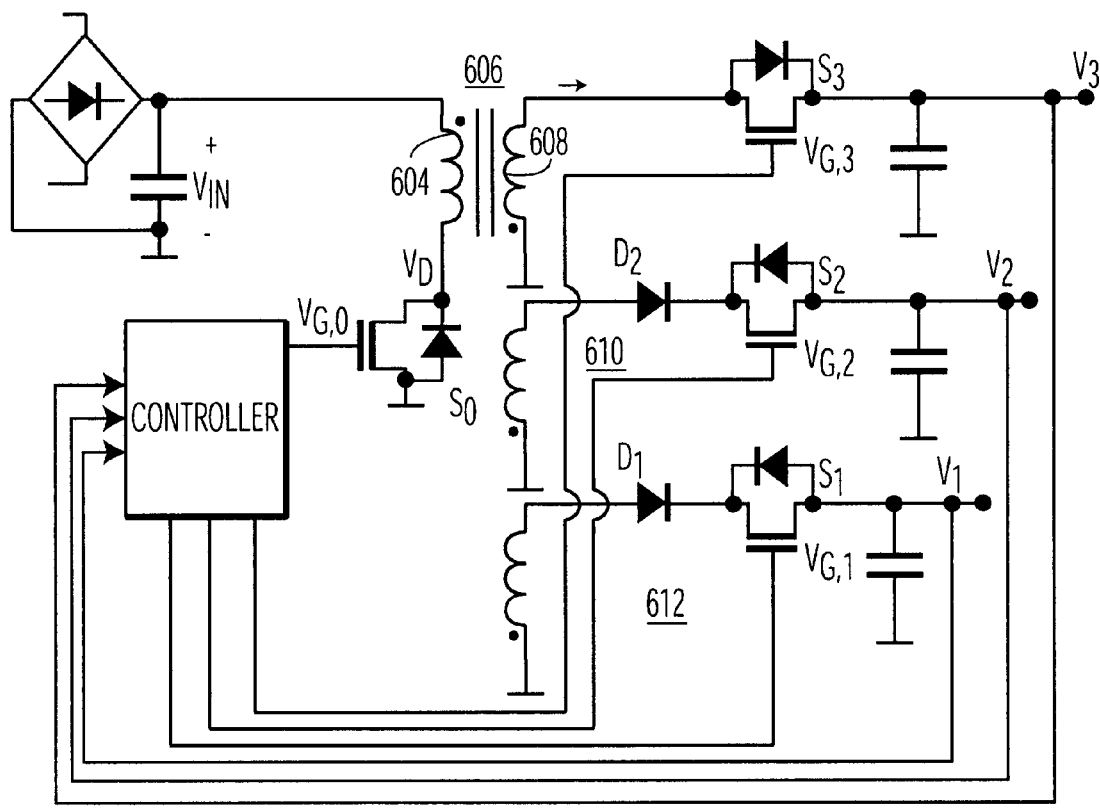
FIG. 7 is a block diagram of a multiple-output, multiple winding bi-directional flyback converter according to one embodiment of the invention.

FIG. 7 is a block diagram of a multiple-output, multiple winding bi-directional flyback converter according to one embodiment of the invention. This embodiment is similar to the one depicted in FIG. 5 except that the transformer 606 in FIG. 6 has a primary winding 604 and a plurality of secondary winding 608, 610, and 612. In this embodiment, each output voltage circuit is connected to a separate secondary winding. By using separate windings to supply current to each output, the switching losses of switching device $S_1$ and $S_2$ can be further reduced. This can be accomplished by choosing the values of the reflected voltages $V_{r1}$, $V_{r2}$, and $V_{r3}$ of the output voltages $V_1$, $V_2$, and $V_3$ to be approximately the same.

The above-described embodiments of the invention enhance the efficiency, reduce the cost and achieve low-power modes of operation in multiple-output off-line power converters. It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

We claim:

1. A bi-directional flyback converter, comprising:
   an input power supply;
   a transformer with a primary winding and a secondary winding;
   an input switch with an associated diode, wherein a first end of the primary winding is connected to the input power supply and a second end of the primary winding is connected to the input switch;
   a first predetermined number of output voltage circuits connected to the secondary winding each producing an output voltage, each output voltage circuit having an output switch with an associated diode, and a diode connected in series between the output voltage switch and the secondary winding;
   a last output voltage circuit with a bi-directional switch and associated diode in connection with the secondary winding;
   a control unit for controlling the switching of the input switch, the predetermined number of output switches and the bi-directional switch, wherein the switching of the bi-directional switch is controlled so as to allow for soft switching of the input switch.

2. The bi-directional flyback converter according to claim 1, wherein the input switch, the predetermined number of output switches and the bi-directional switch are transistor switches.

3. The bi-directional flyback converter according to claim 2, wherein the diodes associated with each switch are body diodes of the transistor switches.

4. The bi-directional flyback converter according to claim 2, wherein each transistor switch has a conductive path and a control terminal.

5. The bi-directional flyback converter according to claim 4, wherein the control unit controls the transistor switches by sending control signals to the control terminal of each transistor switch.

6. The bi-directional flyback converter according to claim 1, wherein the soft switching of the input switch is achieved by driving a negative primary current through the diode associated with the input switch which pulls a drain voltage of the input switch to approximately zero before the input switch is turned on.

7. The bi-directional flyback converter according to claim 6, wherein current fed back from the bi-directional switch drives the primary current negative.

8. The bi-directional flyback converter according to claim 1, wherein the output switches regulate the output voltages.

9. The bi-directional flyback converter according to claim 1, wherein the switching order of the output switches and bi-directional switch is such that the bi-directional switch is last in a switching cycle.

10. The bi-directional flyback converter according to claim 1, wherein a conduction time of the input switch is controlled to regulate a drain voltage of the input switch to approximately zero before the input switch is turned on.

11. The bi-directional flyback converter according to claim 10, wherein the conduction time of the input switch increases for higher input voltages.

12. A bi-directional flyback converter, comprising:

an input power supply;

a transformer with a primary winding and a plurality of separate secondary windings;

an input switch with an associated diode, wherein a first end of the primary winding is connected to the input power supply and a second end of the primary winding is connected to the input switch;

a first predetermined number of output voltage circuits each connected to a separate secondary winding, each producing an output voltage, each output voltage circuit having an output switch with an associated diode, and a diode connected in series between the output voltage switch and the secondary winding;

a last output voltage circuit with a bi-directional switch and associated diode in connection with a separate secondary winding;

a control unit for controlling the switching of the input switch, the predetermined number of output switches and the bi-directional switch, wherein the switching of the bi-directional switch is controlled so as to allow for soft switching of the input switch.

13. The bi-directional flyback converter according to claim 12, wherein the input switch, the predetermined number of output switches and the bi-directional switch are transistor switches.

14. The bi-directional flyback converter according to claim 13, wherein the diodes associated with each switch are body diodes of the transistor switches.

15. The bi-directional flyback converter according to claim 13, wherein each transistor switch has a conductive path and a control terminal.

16. The bi-directional flyback converter according to claim 15, wherein the control unit controls the transistor switches by sending control signals to the control terminal of each transistor switch.

17. The bi-directional flyback converter according to claim 12, wherein the soft switching of the input switch is achieved by driving a negative primary current through the diode associated with the input switch which pulls a drain voltage of the input switch to approximately zero before the input switch is turned on.

18. The bi-directional flyback converter according to claim 17, wherein current fed back from the bi-directional switch drives the primary current negative.

19. The bi-directional flyback converter according to claim 12, wherein the output switches regulate the output voltages.

20. The bi-directional flyback converter according to claim 12, wherein the switching order of the output switches and bi-directional switch is such that the bi-directional switch is last in a switching cycle.

21. The bi-directional flyback converter according to claim 12, wherein a conduction time of the input switch is controlled to regulate a drain voltage of the input switch to approximately zero before the input switch is turned on.

22. The bi-directional flyback converter according to claim 21, wherein the conduction time of the input switch increases for higher input voltages.

23. The bi-directional flyback converter according to claim 12, wherein switching losses for each of the output switches are reduced by choosing values of reflected voltages sent to the control unit to be approximately equal.

24. A method for providing soft switching for an input switch in a bi-directional flyback converter, comprising the steps of:

starting a conduction period for the input switch before turning in the input switch;

successively switching on an output switch in at least one output voltage circuit before turning off the input switch;

switching on a last bi-directional output switch after the at least one output switch has been switched off, wherein a negative current is created in the bi-directional switch while the bi-directional switch is switched on, wherein the negative current flows back to a diode associated with the input switch, thereby pulling a drain voltage of the input switch to approximately zero during the conductive period of the input switch prior to the input switch being turned on again.

* * * * *